US008488485B2

(12) United States Patent
Carlsson et al.

(10) Patent No.: US 8,488,485 B2
(45) Date of Patent: Jul. 16, 2013

(54) PACKET LATENCY ESTIMATION

(75) Inventors: Roland Carlsson, Öjersjö (SE); Aare Mällo, Göteborg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 308 days.

(21) Appl. No.: 12/994,332

(22) PCT Filed: May 23, 2008

(86) PCT No.: PCT/EP2008/056367
§ 371 (c)(1),
(2), (4) Date: Nov. 23, 2010

(87) PCT Pub. No.: WO2009/141012
PCT Pub. Date: Nov. 26, 2009

(65) Prior Publication Data
US 2011/0075588 A1    Mar. 31, 2011

(51) Int. Cl.
*H04L 12/26*    (2006.01)
(52) U.S. Cl.
USPC ........... 370/252; 370/230; 370/235; 370/231; 370/238; 370/229
(58) Field of Classification Search
None
See application file for complete search history.

(56) References Cited

U.S. PATENT DOCUMENTS

| | | | | |
|---|---|---|---|---|
| 5,572,523 A | * | 11/1996 | Katsube et al. | 370/231 |
| 5,737,314 A | * | 4/1998 | Hatono et al. | 370/235 |
| 5,850,385 A | * | 12/1998 | Esaki | 370/395.21 |
| 6,226,266 B1 | * | 5/2001 | Galand et al. | 370/235 |
| 6,266,323 B1 | * | 7/2001 | Valko et al. | 370/230 |
| 6,820,128 B1 | * | 11/2004 | Firoiu et al. | 709/233 |
| 7,006,435 B1 | * | 2/2006 | Davies et al. | 370/230 |
| 7,013,318 B2 | * | 3/2006 | Rosengard et al. | 715/255 |
| 7,336,613 B2 | * | 2/2008 | Lloyd et al. | 370/237 |
| 7,346,005 B1 | * | 3/2008 | Dowdal | 370/252 |
| 7,492,717 B2 | * | 2/2009 | Mosko | 370/238 |
| 7,936,692 B1 | * | 5/2011 | Jacobs et al. | 370/252 |
| 2010/0214934 A1 | * | 8/2010 | Conan et al. | 370/252 |
| 2011/0075588 A1 | * | 3/2011 | Carlsson et al. | 370/252 |

* cited by examiner

*Primary Examiner* — Andrew Lai
*Assistant Examiner* — Hoyet H Andrews

(57) ABSTRACT

An intermediary node is adapted for receiving a sequence of packets from a server, wherein the intermediary node comprises a time estimator adapted for performing the following steps—resolving the sequence number (k) and time of arrival to the intermediary node for at least a plurality (q) of incoming packets; establishing the frame period of the incoming packets (T); establishing a sequence of normalized packet arrival times ($e_k$) as corresponding to the established frame period (T); calculating the relative arrival time ($rt_{rec, k}$) of the plurality (q) of incoming packets in relation to the normalized packet arrival times; creating a cumulative density function (CDF) for a given sequence of packets; and establishing the threshold value for the relative arrival time ($rt_{PL}$) yielding the predefined packet loss (PL) based on the cumulative density function (CDF).

18 Claims, 5 Drawing Sheets

| k | 1 | 2 | 3 | 4 | 5 | 6 | 7 | 8 | 9 | 10 | 11 | 12 | 13 |
|---|---|---|---|---|---|---|---|---|---|----|----|----|----|
| t | 20 | 22 | 25 | 29 | 30 | 30 | 33 | 35 | 37 | 38 | 39 | 40 | 42 |
| e (T=2) | 20 | 22 | 24 | 26 | 28 | 30 | 32 | 34 | 36 | 38 | 40 | 42 | 44 |
| $r_t$ | 0 | 0 | 1 | 3 | 2 | 0 | 1 | 1 | 1 | 0 | -1 | -2 | -2 |

PACKETS
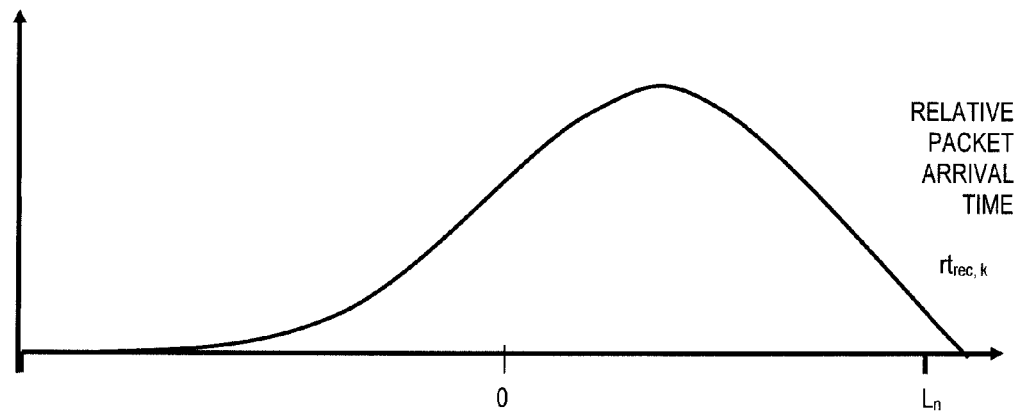
FIG. 3 - PDF
PROBABILITY
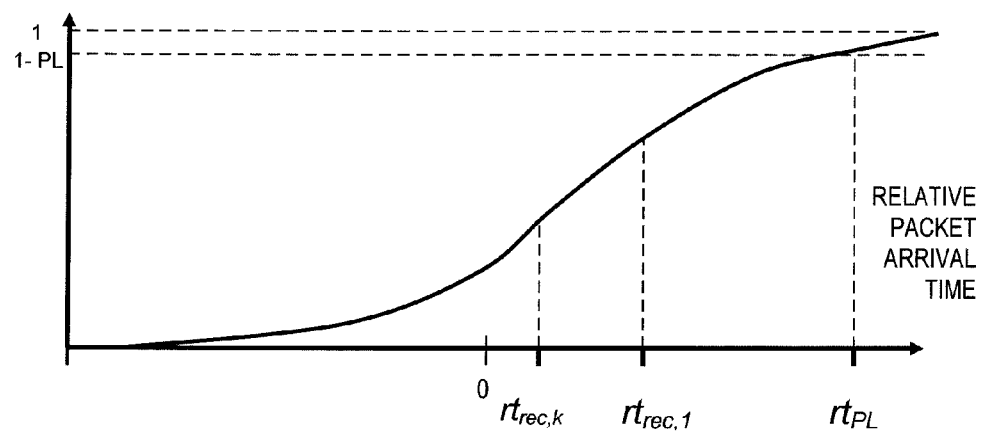
FIG. 4 - CDF

PACKET LATENCY ESTIMATION

TECHNICAL FIELD

This invention pertains to inelastic services form a server that transmits data in a frame-wise fashion (e.g. VoIP) at a fixed frequency, at least during given periods of time, over one or more nodes, in which least one node experiences a time varying channel, e.g. radio. In particular, the invention relates to a scheduler and a method therefore in a wireless base station.

BACKGROUND

Some widely used Internet services are inelastic such as VoIP (Voice over Internet Protocol), that is, data packets are generated frame-wise at a predominantly fixed frequency. Such services often require a small roundtrip time (RTT) in order to work well.

In mobile networks (e.g. IEEE 802.16 and 3rd Generation Partnership Project (3GPP)), a scheduler in the base station distributes the transmission capacity "fairly" between different data transmission flows or at least in such a manner that given needs of given occurring user entities can be served in accordance with agreed service level requirements. At the same time, the scheduler typically aims to utilize the transmission capacity in a way so that the "total transmissions" in the network can be maximized. This maximization of total transmissions typically involves delaying individual transmissions to suitable transmissions instances. Hence, scheduling involves that the available bandwidth is utilized in an optimized way such that a majority of users of the system are served according to agreed quality of service requirements.

A low latency requirement for a given traffic flow, takes up a high "transmission capacity", since the flexibility for scheduling concurrent traffic flows is diminished. For wireless systems, where channel conditions typically vary substantially over time, e.g. due to the changing location for mobile stations, a large allowable delay, i.e. the time from a packet is received from a higher order equipment until the packet is transmitted to the mobile station, is preferred.

A VoIP service is often routed over several nodes where some nodes may use wireless transmissions. In order to ensure reasonable round trip times for e.g. VoIP services, the delay for each individual VoIP packet is typically set to a predefined maximum allowable value in each node.

The low round trip time (RTT) requirements for VoIP services imply that transmission capacity must be dedicated for such wireless transmissions. Since a VoIP session may be routed over several nodes, each node must comply with a predefined allowable maximum latency in order to guarantee a low total RTT.

In many prior art systems, latency requirements imply a negative toll on the total capacity of individual nodes and of the system in which the nodes are comprised.

SUMMARY

It is a first object of the invention to increase the capacity in systems in which periodic transmissions are offered over at least a time varying channel.

This object has been solved by providing a intermediary node (14) adapted for receiving a sequence of a packets from a server (10) and re-transmitting the sequence of packets over a time variant channel to a receiving entity (15), wherein a given predefined latency $L_n$ pertain to the intermediary node and wherein a predefined packet loss PL pertains to a sequence of packets transmitted from the server over a path of a series of arbitrary nodes ( ) to the intermediary node (14) and further on to the receiving entity (15). The intermediary node comprises a time estimator (103) adapted for performing the following steps resolving the sequence number (k) and time of arrival to the intermediary node for at least a plurality (q) of incoming packets;

establishing the frame period of the incoming packets (T);

establishing a sequence of normalized packet arrival times ($e_k$) as corresponding to the sensed frame period (T);

calculating the relative arrival time $rt_{rec, k}$ of the plurality (q) of incoming packets in relation to the normalized packet arrival times;

creating a cumulative density function (CDF) for a given sequence of packets;

establishing the threshold value for the relative arrival time $rt_{PL}$ yielding the predefined packet loss (PL) based on the cumulative density function (CDF).

The above abject has also been accomplished by a method for receiving a sequence of a packets from a server (10) over an intermediary node (14) and re-transmitting the sequence of packets over a time variant channel to a receiving entity (15), wherein a given predefined latency $L_n$ pertaining to the intermediary node and wherein a predefined packet loss PL pertains to a sequence of packets transmitted from the server over a path of a series of arbitrary nodes (11, 12, 13, 16) to the intermediary node (14) and further on to the receiving entity (15); comprising the following steps resolving the sequence number (k) and time of arrival to the intermediary node for at least a plurality (q) of incoming packets (21);

establishing the frame period of the incoming packets (T) (22);

establishing (23) a sequence of normalized packet arrival times ($e_k$) as corresponding to the sensed frame period (T);

calculating (24) the relative arrival time $rt_{rec, k}$ of the plurality (q) of incoming packets in relation to the normalized packet arrival times;

creating (25) a cumulative density function (CDF) for a given sequence of packets;

establishing (26) the threshold value for the relative arrival time $rt_{PL}$ yielding the predefined packet loss (PL) based on the cumulative density function (CDF).

According to the invention, it is observed that even if a first node manages to transmit faster than it's allowed maximum latency, the saved delay time can not be used in the intermediary node in order to minimize the needed transmission capacity. The reason is that the absolute reception deadline in the final receiver (e.g. the mobile receiving entity) is not known by the intermediary node.

According to the invention, it is moreover observed that the channel capacity, say between a base station and mobile station (UE), varies over time, especially when the UE is moving. When several UEs are connected to the cell, the channel capacity is unique for each UE connection. Hence, an enhanced capacity will arise for the channel at different times for the different connections.

As described above, the predefined maximum latency is typically held low in the network in order to guarantee the RTT requirement for VoIP. However, if the scheduler strives to secure a given low latency, it implies that the scheduler must transmit data to a UE irrespective of whether the momentary channel capacity is above or below average. The scheduler may transmit the data on a poor channel requiring excessive transmission capacity.

According to the invention, it is found that it would be preferable to 'wait with the transmission' until the channel capacity to the UE is good. Such handling would lead to an increased scheduling gain. If the "allowable delay" is large, the scheduler can 'wait' to transmit until the channel conditions are sufficiently good. Hence, the required transmission capacity can be reduced if the allowable delay can be increased. By striving to maximize the allowed time delay for the wireless node, the needed transmission resources can be minimized without the total RTT requirement being exceeded.

Further advantages of the invention will appear from the following detailed description of the invention.

The invention is applicable for e.g. inelastic services that produce data in a frame wise fashion (e.g. VoIP).

BRIEF DESCRIPTION OF THE DRAWINGS

FIG. 3 shows an exemplary probability density function (PDF) over relative reception times in a given node, FIG. 4 shows a cumulative density function (CDF) for relative reception times of packets.

DETAILED DESCRIPTION

First Preferred Embodiment of the Invention

A data service provided via a telecom system is normally transmitted over a number of nodes before the data reach its final destination.

Figures 1, 2:
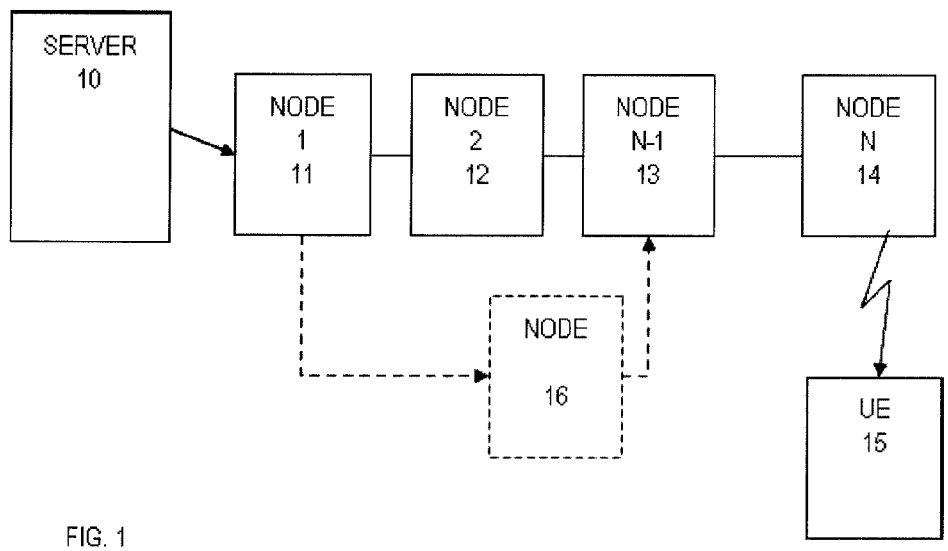
FIG. 1 shows transmission from a server over a number of nodes and a wireless node.
FIG. 2 shows an exemplary table relating to incoming packets.
Figure 5:
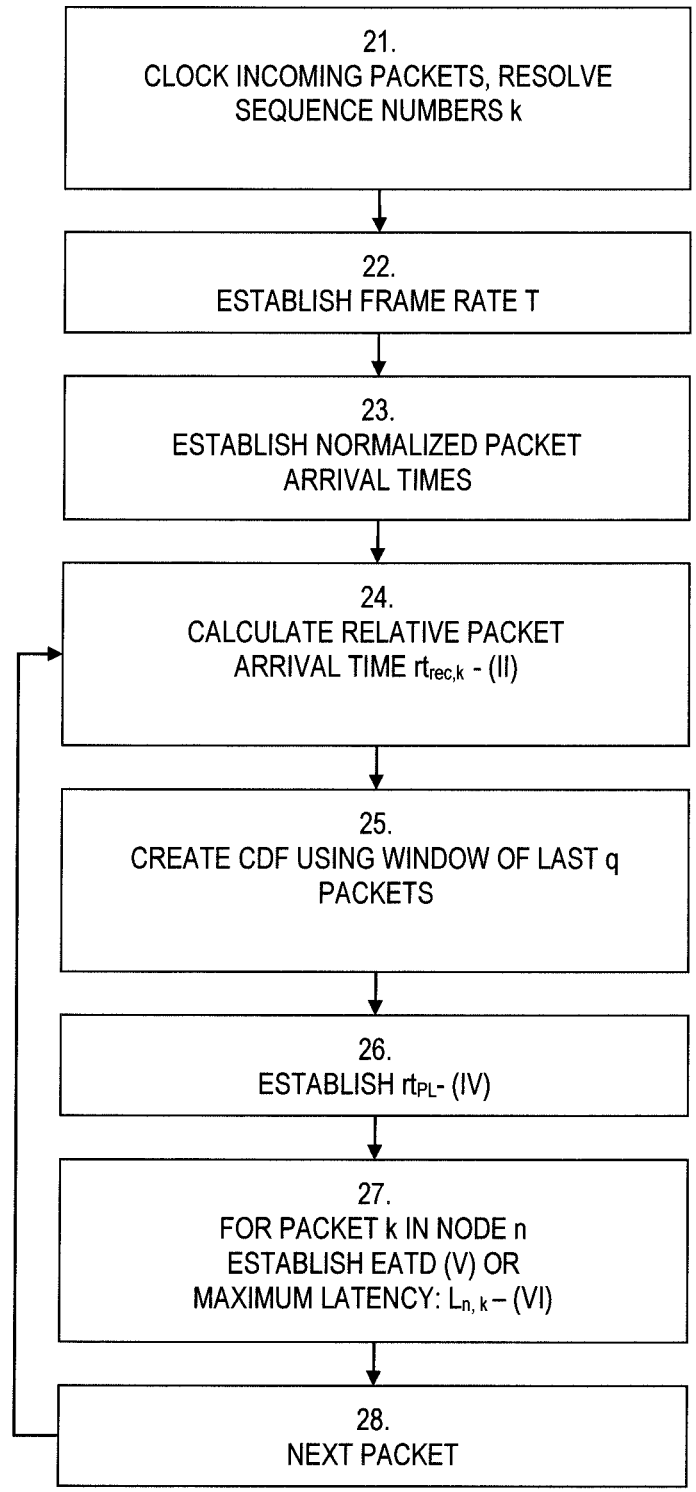
FIG. 5 is a routine according to a first embodiment of the invention.

FIG. 1 shows a communication network in which a communication route is established from a server over a number of transmission nodes, 11-13 (1 ... N−1), through an intermediary node 14 (N), and further to a user entity (15) over a time variant channel. The server transmits packets according to a service transmission at a generally fixed frame rate T. Due to delays in individual nodes in the network, packets are received at a time varying rate, and some packets may even be lost. The pathway may change during the transmission such that the route changes over time such that other nodes, e.g. node 16, are included in the path or replaces previously used nodes, but it is assumed that the route generally remains constant at least for a period of time being larger than the frame rate T. The intermediary node may utilize the time variant channel, such as to transmit at optimized times.

For instance, the server may constitute a server on the Internet, routers may constitute the nodes, and a wireless base station, connecting to the user entity over the air, may constitute the intermediary node. The intermediary node may comprise a scheduler, by which packets to a plurality of users are scheduled for transmission. In particular, if the end users are mobile, the radio channel may experience large variations, which, according to the invention, are advantageously dealt with by scheduling the transmission of packets at times where the channel conditions are above a predetermined quality threshold.

For a VoIP (voice over IP) service, voice packets are decoded at a pace corresponding to the pace at which the voice packets were encoded. I.e. there is a fixed time distance between transmissions of packets; i.e. packets are transmitted at a predominantly fixed frequency (corresponding to the frame period), whereby the receiver "plays back" the voice packets with a fixed delay D.

The data latency for a node is typically specified to be less than a predetermined constant value. Normally, each node transmits the data with a margin to the latency requirement. In such a network, frames transmitted periodically at a frame rate e.g. T=2, may arrive at times t, as exemplary indicated in the table in FIG. 2 (rounded values). The relative arrival time, rt, relative to a normalized arrival time, e, given by the frame rate T are indicated.

According to the invention, an absolute transmission deadline per packet in at least one node in a given network may be estimated. Thereby, a longer delay can be allowed for the scheduling of each individual packet in a given system compared to if no estimation is performed. According to the invention, a higher scheduling gain may be obtained. A high scheduling gain results in a higher total data throughput, which will benefit all user entities in a given cell associated with the intermediary node. The basis for calculating the absolute transmission deadline shall be explained in the following.

In order to ensure that the maximum acceptable delay is D, from server 10 to user entity 15, a predefined maximum latency is specified for each node $L_n$, where n is the node number so that $$\sum_{n=1}^{N} L_n \leq D \qquad (I)$$

and whereby N is a given number of nodes for the transmission.

For VoIP services typically, a number of packet losses are acceptable without considerable deterioration of the voice quality. This predetermined value of the acceptable loss rate is denoted PL.

Hence, for a node n, it would appear that at least a ratio of 1−PL of the received packets are received in time to be played back at the voice decoder provided that the latency in node n will be less or equal to the predefined maximum latency $L_n$ and that all nodes 1 to N−1 fulfil their requirements as to the given predefined maximum latencies=$L_n$.

Each received packet is time stamped with the reception time $t_{rec, k}$ where k is the packet sequence number. Let $t_{rec, 1}$ (i.e. the reception time for the first packet) be the reference time for the subsequent packet arrivals. The relative packet arrival time for each packet is calculated as $$rt_{rec, k} = t_{rec, k} - T \cdot (k-1) - t_{rec, 1} \qquad (II)$$

where T is the frame rate used by the voice coder and where $rt_{rec, 1} = 0$, c.f the example of FIG. 2.

The received relative arrival time for k individual packets $rt_{rec, k}$ can then be presented in a probability density function (PDF) as shown in FIG. 3. Integrating the PDF, a cumulative density function (CDF) can be found as shown in FIG. 4.

Since it can be assumed that at least a ratio of 1−PL packets are received in time at the voice decoder as given by the predefined acceptable packet loss, it can be expressed alternatively that at least the packets having a value rt for the relative arrival time being less than (or equal) to a threshold value for the relative arrival time $rt_{PL}$ will be received in time in order to be played back by the voice decoder:

$$CDF(rt_{PL})=1-PL \qquad (III)$$

In other words, a threshold for the relative arrival time $rt_{PL}$ providing the predetermined packet loss PL can be established according to the function $$rt_{PL}=CDF^{-1}(1-PL) \qquad (IV)$$

The earliest absolute transmission deadline (EATD) can then be calculated as:

$$EATD_k=t_{rec,\,k}+rt_{PL}-rt_{rec,\,k}+L_n \qquad (V)$$

This value may be delivered to the scheduler.

Alternatively, it can be expressed that the maximum latency for packet k in node n can be increased from the given maximum predefined latency requirement pertaining to all packets for a given node to an extended maximum latency requirement for packet k; $L_{n,\,k}$:

$$L_{n,\,k}=L_n+MAX(0,\,rt_{PL}-rt_{rec,\,k}) \qquad (VI)$$

without increasing the packet loss at the voice decoder of the user entity.

The extended maximum latency requirement may be provided to the scheduler.

Figure 6:
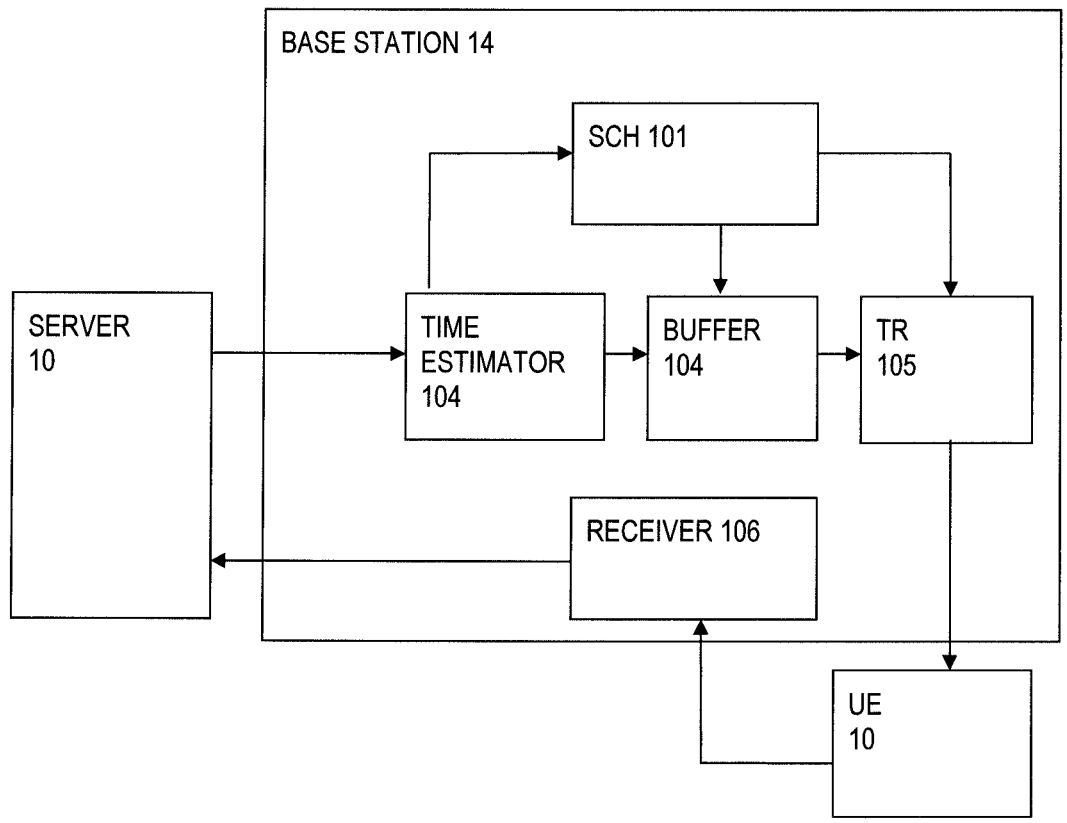
FIG. 6 shows a base station according to a first preferred embodiment of the invention.

In FIG. 6, a base station node corresponding to node 14 in FIG. 1 is shown. The base station 14 comprises a time estimator 103, a queue buffer 104, a transmitter 105 for transmitting packets over an air interface to user entity UE 15 and a scheduler 101, which performs the scheduling of packets which is momentarily stored in buffer 104. A receiver 106 is also provided for receiving up-link traffic from the user entity.

According to one preferred embodiment the time estimator 103 is performing the estimation of the cumulative density function and is providing the extended maximum latency requirement or the earliest absolute transmission deadline (EATD) to the scheduler 101.

It is noted that the actual absolute transmission deadline can be set even later as defined by the applied scheduling policy, the prevalent channel conditions, transmission demand and/or the given capacity in the intermediary node.

According to the first embodiment of the invention, packet losses are ignored and packets are consequently assigned sequence numbers in the order they appear in the base station 14. The frame rate T can be sensed either from an average or given as a set system parameter depending on the given service.

In conclusion, there is provided:

A intermediary node (14) adapted for receiving a sequence of a packets from a server (10) and re-transmitting the sequence of packets over a time variant channel to a receiving entity (15), wherein a given predefined latency $L_n$ pertain to the intermediary node and wherein a predefined packet loss PL pertains to a sequence of packets transmitted from the server over a path of a series of arbitrary nodes ( ) to the intermediary node (14) and further on to the receiving entity (15).

The intermediary node comprises a time estimator (103) adapted for performing the following steps resolving the sequence number (k) and time of arrival to the intermediary node for at least a plurality (q) of incoming packets—step 21;

establishing the frame period of the incoming packets (T)—step 22;

establishing a sequence of normalized packet arrival times ($e_k$) as corresponding to the sensed frame period (T)—step 23;

calculating the relative arrival time $rt_{rec,\,k}$ of the plurality (q) of incoming packets in relation to the normalized packet arrival times step—24;

creating a cumulative density function (CDF) for a given sequence of packets—step 25;

establishing the threshold value for the relative arrival time $rt_{PL}$ yielding the predefined packet loss (PL) based on the cumulative density function (CDF)—step 26;

Advantageously, for each subsequently received packet, the time estimator is establishing in step 27 an absolute transmission deadline ($EATD_k$) from the time of arrival of the received packet ($t_{rec,\,k}$); the established threshold value for the relative arrival time ($rt_{PL}$); the relative arrival time ($rt_{rec,\,k}$) and the predefined latency value ($L_n$) for the retransmission node.

Alternatively, for each subsequently received packet the time estimator is establishing in step 27 an extended maximum latency ($L_{n,\,k}$) from the predefined latency value ($L_n$) for the intermediary node and a maximum value of the difference between the threshold value for the relative arrival time $rt_{PL}$, and the relative arrival time $rt_{rec,\,k}$ for the given packet.

Advantageously, a sequence—or moving window—of individual packets corresponding to a plurality of last received packets is used for establishing the CDF. Thereby, the latest data available for the given communication path is reflected. Hence after step 27, the routine is going to step 21.

There is moreover provided a method for receiving a sequence of a packets from a server (10) over an intermediary node (14) and re-transmitting the sequence of packets over a time variant channel to a receiving entity (15), wherein a given predefined latency $L_n$ pertaining to the intermediary node and wherein a predefined packet loss PL pertains to a sequence of packets transmitted from the server over a path of a series of arbitrary nodes (11, 12, 13, 16) to the intermediary node (14) and further on to the receiving entity (15); comprising the following steps resolving the sequence number (k) and time of arrival to the intermediary node for at least a plurality (q) of incoming packets (21);

establishing the frame period of the incoming packets (T) (22);

establishing (23) a sequence of normalized packet arrival times ($e_k$) as corresponding to the sensed frame period (T);

calculating (24) the relative arrival time $rt_{rec,\,k}$ of the plurality (q) of incoming packets in relation to the normalized packet arrival times;

creating (25) a cumulative density function (CDF) for a given sequence of packets;

establishing (26) the threshold value for the relative arrival time $rt_{PL}$ yielding the predefined packet loss (PL) based on the cumulative density function (CDF).

Further Embodiments of the Invention

According to a further aspect of the invention a prevalent packet loss in any of the previous nodes 1 to N-1 are identified. If packet k is lost, or if packet k-1 and k are concatenated into a new larger packet, in any of the nodes in the path from server to receiving entity, the loss will result in a subsequent packet $rt_{rec,\,k}$ will be calculated as the real $rt_{rec,\,k+1}+T$, i.e. all findings of the relative times rt after packet k-1 will be assigned an increased, and hence erroneous, relative arrival time rt corresponding to the delay by frame time T.

Figure 7:
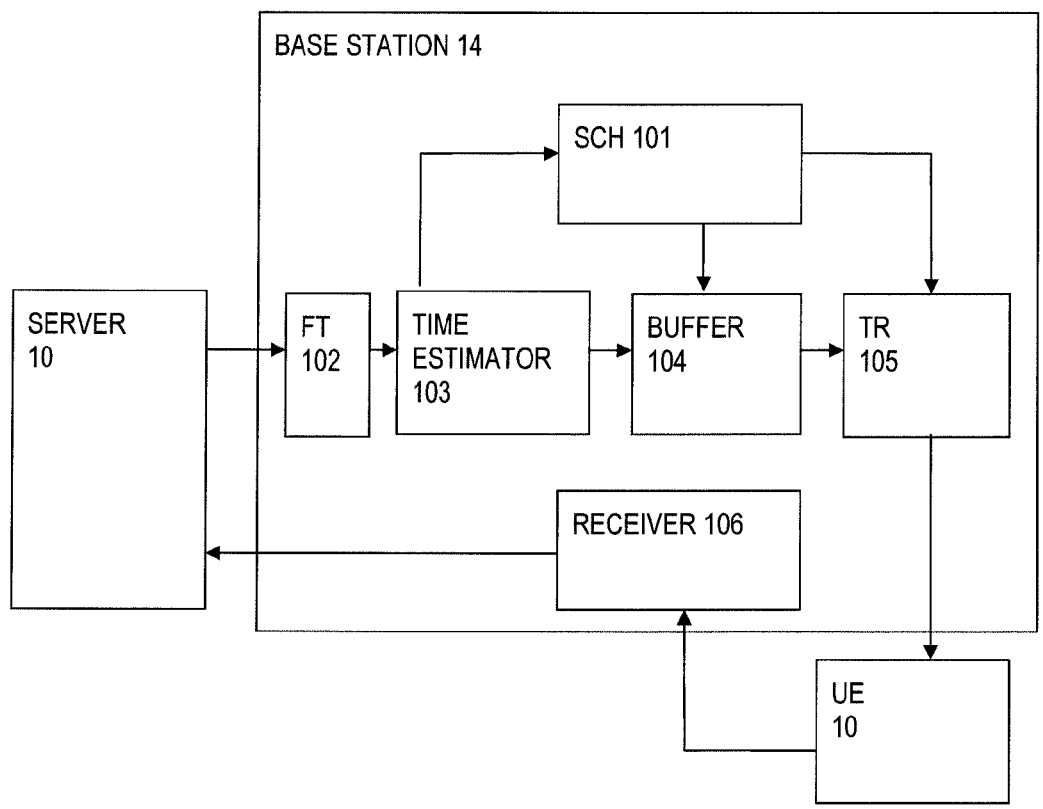
FIG. 7 shows a base station according to a second preferred embodiment of the invention.

In FIG. 7, a second embodiment of a base station is provided, the second bases station differs over the FIG. 6 base station in that a packet sniffer/filtering unit 102 is employed in the base station for detecting a possible frame number/associated with the packet data stream if provided.

According to one further embodiment of the invention, all packets are advantageously identified by a transmission number k (usually provided for packet data) such that it is possible to compensate the relative packet arrival time for lost or concatenated packets, cf. expression II.

An alternative more sophisticated handling where packet loss is affecting the $L_{n,\,k}$ expression may be implemented, such that packets with $rt_{rec,\,k}$ larger than $rt_{PL}$ may be treated different from other packets, e.g. by causing the time estimator to restart the moving window or by associating an incremented transmission number with the belatedly received packet.

The invention claimed is:

1. A system, comprising:
    a server;
    a receiving entity; and
    an intermediary node operable to:
        receive a sequence of incoming packets from the server; and
        re-transmit the sequence of the incoming packets over a time variant channel to the receiving entity;
    wherein a given predefined latency ($L_n$) pertains to the intermediary node;
    wherein a predefined packet loss (PL) pertains to a sequence of packets transmitted from the server over a path of arbitrary nodes to the intermediary node; and
    wherein the intermediary node further comprises a time estimator, the time estimator operable to:
        resolve a sequence number (k) and a time of arrival to the intermediary node for at least each of a plurality (q) of the incoming packets;
        establish a frame period (T) of the incoming packets;
        establish a sequence of normalized packet arrival times ($e_k$) corresponding to the frame period (T);
        calculate a relative arrival time ($rt_{rec,\,k}$) of each of the plurality (q) of the incoming packets in relation to the normalized packet arrival times ($e_k$);
        create a cumulative density function for the sequence of the incoming packets at the intermediary node; and
        establish a threshold value ($rt_L$) for the relative arrival time ($rt_{rec,\,k}$) yielding the predefined packet loss (PL) at the intermediary node based on the cumulative density function.

2. The system of claim 1, wherein for each subsequently received incoming packet, the time estimator is further operable to establish an absolute transmission deadline ($EATD_k$) from:
    the time of arrival of the received incoming packet ($t_{rec,\,k}$);
    the threshold value ($rt_{PL}$) for the relative arrival time ($rt_{rec,\,k}$);
    the relative arrival time ($rt_{rec,\,k}$); and
    the predefined latency value ($L_n$) for the intermediary node.

3. The system of claim 2, wherein the intermediary node further comprises a scheduler, and wherein the absolute transmission deadline (EATDk) is provided to the scheduler.

4. The system of claim 2, wherein an earliest absolute transmission deadline ($EATD_k$) is calculated as:

$$EATD_k = t_{rec,k} \cdot rt_{PL} - rt_{rec,k} + L_n.$$

5. The system of claim 1, wherein for each subsequently received incoming packet, the time estimator is further operable to establish an extended maximum latency ($L_{n,k}$) from:
    the predefined latency value ($L_n$) for the intermediary node; and
    a maximum value of a difference between the threshold value ($rt_{PL}$) for the relative arrival time ($rt_{rec,\,k}$) and the relative arrival time ($rt_{rec,\,k}$) for the incoming packet.

6. The system of claim 5, wherein the intermediary node further comprises a scheduler, and wherein the extended maximum latency ($L_{n,k}$) is provided to the scheduler.

7. The system of claim 5, wherein the extended maximum latency requirement($L_{n,k}$) for a packet k is calculated as:

$$L_{n,k} = L_n + \mathrm{MAX}\,(0, rt_{PL} - rt_{rec,k}),$$

where $L_n$ is the given maximum predefined latency pertaining to all incoming packets.

8. The system of claim 1, wherein the threshold value ($rt_{PL}$) for the relative arrival time ($rt_{rec,\,k}$) is calculated as:

$$rt_{PL} = CDF^{-1}\,(1-PL),$$

where $CDF^{-1}$ is an inverse of the cumulative density function.

9. The system of claim 1, further comprising a packet sniffer operable to detect a possible frame number associated with the incoming packet.

10. The system of claim 1, wherein a sequence of individual incoming packets corresponding to a plurality of last received incoming packets is used for establishing the cumulative density function.

11. A method comprising the following steps:
    receiving a sequence of incoming packets from a server over an intermediary node, wherein a predefined latency ($L_n$) pertains to the intermediary node;
    re-transmitting the sequence of the incoming packets over a time variant channel to a receiving entity, wherein a predefined packet loss (PL) pertains to a sequence of packets transmitted from the server over a path of a series of arbitrary nodes to the intermediary node and further on to the receiving entity;
    resolving a sequence number (k) and time of arrival to the intermediary node for at least each of a plurality (q) of the incoming packets;
    establishing a frame period (T) of the incoming packets;
    establishing a sequence of normalized packet arrival times ($e_k$) corresponding to the frame period (T);
    calculating a relative arrival time ($rt_{rec,\,k}$) of each of the plurality (q) of the incoming packets in relation to the normalized packet arrival times ($e_k$);
    creating a cumulative density function for the sequence of the incoming packets at the intermediary node; and
    establishing a threshold value ($rt_{PL}$) for the relative arrival time ($rt_{rec,\,k}$) yielding the predefined packet loss (PL) at the intermediary node based on the cumulative density function.

12. The method of claim 11, further comprising, for each subsequently received incoming packet, establishing an absolute transmission deadline ($EATD_k$) from:
    the time of arrival of the received incoming packet ($t_{rec,\,k}$);
    the threshold value ($rt_{PL}$) for the relative arrival time ($rt_{rec,\,k}$);
    the relative arrival time ($rt_{rec,\,k}$); and
    the predefined latency value ($L_n$) for the intermediary node.

13. The method of claim 11, further comprising, for each subsequently received incoming packet, establishing an extended maximum latency ($L_{n,k}$) from:
    the predefined latency value ($L_n$) for the intermediary node; and a maximum value of a difference between the threshold value ($rt_{PL}$) for the relative arrival time ($rt_{rec,\,k}$) and the relative arrival time ($rt_{rec,\,k}$) for the incoming packet.

14. The method of claim 13, wherein the extended maximum latency ($L_{n,k}$) for a packet k is calculated as:

$$L_{n,k} = +MAX(0, rt_{PL} - rt_{rec,\,k}),$$

where $L_n$ is the a given maximum predefined latency pertaining to all incoming packets.

15. The method of claim 11, wherein the threshold value ($rt_{PL}$) for the relative arrival time ($rt_{rec,\,k}$) is calculated as:

$$rt_{PL} = CDF^{-1}(1-PL),$$

where $CDF^{-1}$ is an inverse of the cumulative density function.

16. The method of claim 12, wherein an earliest absolute transmission deadline ($EATD_k$) is calculated as:

$$EATD_k = t_{rec,k} + rt_{PL} - rt_{rec,k} + L_n.$$

17. The method of claim 11, further comprising using a packet sniffer to detect a possible frame number associated with a given incoming packet.

18. The method of claim 11, further comprising using a sequence of individual incoming packets corresponding to a plurality of last received incoming packets to establish the cumulative density function.

* * * * *

UNITED STATES PATENT AND TRADEMARK OFFICE
CERTIFICATE OF CORRECTION

PATENT NO. : 8,488,485 B2
APPLICATION NO. : 12/994332
DATED : July 16, 2013
INVENTOR(S) : Carlsson et al.

It is certified that error appears in the above-identified patent and that said Letters Patent is hereby corrected as shown below:

In the Claims

In Column 7, Line 67, in Claim 4, delete "$EATD_k = t_{rec,k} rt_{PL} - rt_{rec,k} + L_n$," and insert -- $EATD_k = t_{rec,k} + rt_{PL} - rt_{rec,k} + L_n$ --, therefor.

In Column 8, Line 15, in Claim 7, delete "$L_{n,k} = L_n + MAX((), rt_{PL} - rt_{rec,k})$," and insert -- $L_{n,k} = L_n + MAX(0, rt_{PL} - rt_{rec,k})$ --, therefor.

In Column 9, Line 7, in Claim 14, delete "$L_{n,k} = +MAX(0, rt_{PL} - rt_{rec,k})$," and insert -- $L_{n,k} = L_n + MAX(0, rt_{PL} - rt_{rec,k})$ --, therefor.

In Column 9, Line 8, in Claim 14, delete "the a" and insert -- the --, therefor.

In Column 9, Line 18, in Claim 16, delete "$EATD_k = t_{rec,k} + rt_{PL} - rt_{rec,k} + L_n$," and insert -- $EATD_k = t_{rec,k} + rt_{PL} - rt_{rec,k} + L_n$ --, therefor.

Signed and Sealed this
Sixth Day of May, 2014

Michelle K. Lee
*Deputy Director of the United States Patent and Trademark Office*